United States Patent [19]

Willis et al.

[11] 4,316,008

[45] Feb. 16, 1982

[54] METHOD FOR REMOVING CATALYST RESIDUES FROM ATACTIC POLYPROPYLENE

[75] Inventors: Carl L. Willis; Lynn H. Slaugh, both of Houston, Tex.

[73] Assignee: Shell Oil Company, Houston, Tex.

[21] Appl. No.: 209,627

[22] Filed: Nov. 24, 1980

[51] Int. Cl.$^3$ .................................................. C08F 6/08
[52] U.S. Cl. .................................... 528/487; 528/498; 528/501; 528/503
[58] Field of Search ................ 528/487, 493, 498, 501

[56] References Cited

U.S. PATENT DOCUMENTS

| | | | |
|---|---|---|---|
| 3,080,353 | 3/1963 | Bonvicini | 328/487 |
| 3,125,560 | 3/1964 | Rose | 328/487 X |
| 3,268,501 | 8/1966 | Crouch | 328/487 |
| 3,310,541 | 3/1967 | Breuers | 328/487 X |
| 3,338,878 | 8/1967 | Kutner | 328/487 |

*Primary Examiner*—C. A. Henderson

[57] ABSTRACT

Process for removing catalyst residues from atactic polypropylene is disclosed which comprises contacting the polypropylene with an aqueous solution of an alpha-hydroxysulfonic acid and then separating the polypropylene-containing phase from the aqueous phase.

6 Claims, No Drawings

METHOD FOR REMOVING CATALYST RESIDUES FROM ATACTIC POLYPROPYLENE

FIELD OF THE INVENTION

This invention relates to a process for removing catalyst residues from atactic polypropylene.

BACKGROUND OF THE INVENTION

In the commercial preparation of isotactic polypropylene using Ziegler-type catalysts, a significant by-product is atactic polypropylene. This atactic polypropylene is recovered in substantial quantities in the purification of the principal product, isotactic polypropylene. As recovered, the atactic polypropylene contains significant, say, up to about 10% by weight, of inorganic catalyst residues. This contaminated product is of no value and is currently discarded in a landfill. If the inorganics could be removed from the atactic polypropylene stream, the purified product could command a premium price in the adhesives market for example.

Alpha-hydroxysulfonic acids have been disclosed in the literature (see for example U.S. Pat. No. 3,248,278 issued Apr. 26, 1966 and U.S. Pat. No. 4,113,842 issued Sept. 12, 1978) for use in the removal of metal ions from aqueous metal streams. The process of the instant invention uses alpha-hydroxysulfonic acids for the removal of ionic residues from non-aqueous systems.

SUMMARY OF THE INVENTION

The present invention provides a method for purifying an atactic polypropylene stream of catalyst residues such as $Ti^{4+}$, $Al^{3+}$, $Na^+$ and $Cl^-$ by contacting the atactic polypropylene which has been slurried or dissolved in a higher alkane with an aqueous solution of an alpha-hydroxysulfonic acid. After contact the aqueous and non-aqueous phases are separated, leaving the purified polypropylene in the non-aqueous phase. The alpha-hydroxysulfonic acid is readily prepared by reacting a carbonyl compound, sulfur dioxide and water. After extraction the carbonyl compound is readily recovered from the resultant sulfonate the carbonyl compound is readily recovered from the resultant sulfonate by the application of heat. Residual alpha-hydroxysulfonic acid remaining in the polymer phase can readily be decomposed by the application of heat and/or vacuum, thereby driving off the sulfur dioxide.

DESCRIPTION OF THE PREFERRED EMBODIMENTS

The alpha-hydroxysulfonic acids used in the extraction process of the instant invention are prepared by reacting a carbonyl compound with sulfur dioxide and water according to the following general equation.

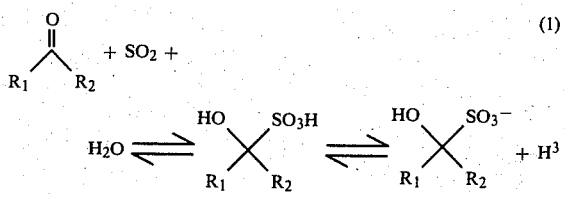

(1)

Where $R_1$ and $R_2$ are hydrogen or hydrocarbyl with up to about 7 carbon atoms. Preferably the hydrocarbyl is unsubstituted or substituted alkyl with up to about 7 carbon atoms.

Illustrative examples of carbonyl compounds useful to prepare the alpha-hydroxysulfonic acids used in this invention are found where $R_1 = R_2 = H$ (formaldehyde)
$R_1 = H$, $R_2 = CH_3$ (acetaldehyde)
$R_1 = H$, $R_2 = CH(CH_3)_2$ (i-butyraldehyde)
$R_1 = H$, $R_2 = \underline{CCHCHCHO}$ (furfural)
$R_1 = H$, $R_2 = \underline{C(CH)_4}C(OH)$ (salicylaldehyde)
$R_1 = H$, $R_2 = \underline{C(CH)_4}CH$ (benzaldehyde)
$R_1 = R_2 = CH_3$ (acetone)
$R_1 = CH_3$, $R_2 = CH_2CH_3$ (methyl ethyl ketone)
$R_1 = CH_3$, $R_2 = CHC(CH_3)_2$ (mesityl oxide)
$R_1 = CH_3$, $R_2 = CH_2CH(CH_3)_2$ (methyl i-butyl ketone)
$R_1, R_2 = (CH_2)_5$ cyclohexanone) or
$R_1 = CH_3$, $R_2 = CH_2Cl$ (chloroacetone)

A unique feature of these acids is the reversibility of the acid formation (eq. 1). That is, when heated, sulfur dioxide is liberated and the solution becomes neutral. Decreasing the sulfur dioxide pressure for the system induces the same effect. This reversibility provides a good method for removing unutilized acid, i.e., by increasing the temperature or lowering the pressure, the sulfur dioxide can be driven off, leaving the carbonyl compound and water which can be removed by conventional means, such as distillation. Thus, by the application of heat and/or vacuum under appropriate conditions as determined by the individual alpha-hydroxysulfonic acid, the alpha-hydroxysulfonic acid can be decomposed into its components freeing the sulfur dioxide.

Metal ions are thought to chelate with the alpha-hydroxysulfonic acid according to the following formula.

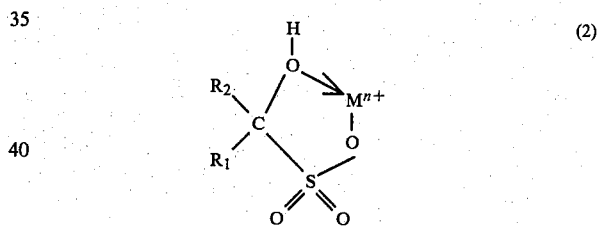

(2)

Where $M^{n+}$ is for example $Ti^{4+}$, $Al^{3+}$, $Na^+$, etc. The spent aqueous extractant will contain the sulfonate of formula (2) and if desired the carbonyl compound can be recovered for recycle by the application of heat according to the following formula.

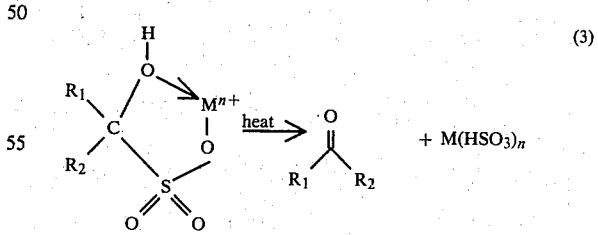

(3)

In general the crude atactic polypropylene to be purified will be contained in either a slurry or a solution of a higher boiling alkane with a carbon number ranging from about 4 to about 12, preferably from about 6 to about 10. Hexane and heptane are preferred slurring and solvent agents.

The catalyst residues to be removed in the instant invention result from the use of Ziegler-type catalysts which are well known in the art. Typically they are complexes of compounds of metals of Group I to III in the periodic table with derivatives of transition metals of Group IV to VIII. The most commonly used Group I to III metal is aluminum (e.g. in the form of aluminum trialkyls and various aluminum alkyl halides). Other Group I to III metal compounds may be present. Halide atoms are involved in almost (but not quite) all such catalyst systems. The transition metal compound is most frequently a titanium halide, usually a chloride, although other compounds such as vanadium chloride, zirconium chloride and chromium acetylacetonate are used.

The alpha-hydroxysulfonic acid is prepared according to equation 1, using an excess of water over the stoicheometric amount in order to provide an aqueous solution. The aqueous solution of alpha-hydroxysulfonic acid is contacted with the slurry or solution of atactic polypropylene and after suitable mixing and contact time the aqueous phase is separated from the organic phase(s). Additional water and/or alkane may be added prior to separation to facilitate separation. Methods of contacting and separation of different phases are routine and well known in the art. After separation, the atactic polypropylene phase can further be concentrated by removing the alkane. The temperature at which the extraction takes place will depend upon the particular alpha-hydroxysulfonic acid being utilized. Since equation (1) is a temperature dependent equilibrium reaction, the extraction must be carried out at a temperature low enough to allow formation of sufficient alpha-hydroxysulfonic acid. The lower carbonyl compounds can be used at higher temperatures. For example, alpha-hydroxymethanesulfonic acid can be used at temperatures up to about 100° C. (at one atmosphere); alpha-hydroxymethanesulfonic acid at temperatures up to about 60° C. (at one atmosphere), etc. The temperature-equilibrium concentration of the alpha-hydroxysulfonic acid can readily be determined by routine experimentation.

The invention will be illustrated by reference to the following Illustrative Embodiments which are provided for illustration and are not to be construed as limiting the invention.

ILLUSTRATIVE EMBODIMENTS

In a typical preparation of an alpha-hydroxysulfonic acid, in particular alpha-hydroxymethanesulfonic acid, about 30 grams of sulfur dioxide were condensed (dry ice/acetone bath) into a 200 cc Fisher-Porter pressure bottle. The reaction vessel was opened and slightly less than one equivalent of aqueous formaldehyde solution (37% w $H_2CO$) was added. The pressure bottle was sealed and the mixture warmed to room temperature. The mixture was stirred vigorously overnight and then vented ($SO_2$) to the atmosphere. Analysis of the resulting aqueous phase (potentiometric titration with $NaOH/H_2O$) typically found about 5 M alpha-hydroxymethanesulfonic acid and a trace of sulfur dioxide. The solution could be stored for up to about four weeks in the pressure bottle without loss in activity.

Example 1: Slurry Extraction

A slurry of 23.9 g of atactic polypropylene in 12 g of heptane was contacted with 10 g (50 mmol) of an aqueous solution of alpha-hydroxymethanesulfonic acid at room temperature. The mixture was agitated for 12 hours. To facilitate the physical separation of the aqueous layer, 25 g of water were added to the reaction mixture after the acid had reacted. After separation the organic phase was concentrated by removing the heptane, affording a white polypropylene product which was analyzed (i.e., extracted atactic polypropylene). The aqueous phase was analyzed as well. The results are shown in Table 1. It can be seen that a single extraction removed more than half of the catalyst residue from the atactic polypropylene. Additional extractions or using more extractant in the first extraction could be used to reduce this even more. No discoloration of the product was caused by residual acid.

Example 2: Solution Extraction

A solution of 3.04 g of atactic polypropylene dissolved in 30 g of heptane was contacted with 15 g (75 mmol) of an aqueous solution of alpha-hydroxymethanesulfonic acid. The mixture was agitated for 30 minutes. After separation the organic phase was concentrated by removing the heptane, affording a white polypropylene product which was analyzed. The results are shown in Table 1. No discoloration of the product was caused by residual acid.

TABLE 1

| | Catalyst Residues in Atactic Polypropylene | | | | | | | |
|---|---|---|---|---|---|---|---|---|
| | BEFORE (AFTER) DEASHING (PPM) | | | | % ASH REMOVED | | | |
| | Ti | Al | Na | Cl | Ti | Al | Na | Cl |
| Example 1 | 5,300 (3,000) | 8,000 (4,200) | 29,000 (11,900) | 13,200 (9,700) | 43 | 48 | 59 | 27 |
| Example 2 | 5,300 (400) | 8,000 (110) | 29,000 (1,400) | 13,200 (1,700) | 92 | 99 | 95 | 87 |

It is claimed:

1. A process for removing catalyst residues of Group I–III and Group IV–VIII of the Periodic Table from atactic polypropylene which comprises (a) slurrying or dissolving atactic polypropylene in an alkane having a carbon number from about 4 to about 12 to produce an organic phase, (b) contacting said organic phase with an aqueous phase containing an alpha-hydroxy sulfonic acid having the following general formula:

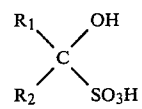

wherein $R_1$ and $R_2$ are individually hydrogen or hydrocarbyl of up to about 7 carbon atoms and (c) subsequently separating the polypropylene-containing organic phase from the aqueous phase thereby producing an organic phase having substantially removed therefrom said catalyst residues.

2. The process of claim 1, wherein the atactic polypropylene is utilized as a solution in an alkane.

3. The process of claim 1 wherein the atactic polypropylene is utilized as a slurry in an alkane.

4. The process of claim 2 or 3 wherein the alkane has a carbon number ranging from about 6 to about 10.

5. The process of claim 2 or 3 wherein the alkane is hexane, heptane or cyclohexane.

6. The process of claims 1, 2 or 3 wherein the polypropylene-containing organic phase after separation is additionally subjected to heat and/or vacuum in order to decompose any residual alpha-hydroxymethanesulfonic acid and thereby driving off the sulfur dioxide.

* * * * *